United States Patent
Hirose

(10) Patent No.: US 9,019,564 B2
(45) Date of Patent: Apr. 28, 2015

(54) IMAGE PROCESSING APPARATUS, IMAGE PROCESSING METHOD, AND COMPUTER-READABLE MEDIUM

(71) Applicant: Canon Kabushiki Kaisha, Tokyo (JP)

(72) Inventor: Fumiaki Hirose, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/675,762

(22) Filed: Nov. 13, 2012

(65) Prior Publication Data

US 2013/0120803 A1 May 16, 2013

(30) Foreign Application Priority Data

Nov. 15, 2011 (JP) ................. 2011-249858

(51) Int. Cl.
| | | |
|---|---|---|
| *H04N 1/405* | (2006.01) | |
| *H04N 1/387* | (2006.01) | |
| *H04N 1/401* | (2006.01) | |
| *H04N 1/047* | (2006.01) | |

(52) U.S. Cl.
CPC ............. *H04N 1/387* (2013.01); *H04N 1/3878* (2013.01); *H04N 1/4015* (2013.01); *H04N 1/047* (2013.01); *H04N 2201/04787* (2013.01); *H04N 2201/04789* (2013.01); *H04N 2201/04791* (2013.01); *H04N 2201/04796* (2013.01)

(58) Field of Classification Search
CPC .......... H04N 2201/04787; H04N 1/06; H04N 1/0671; H04N 1/1911; H04N 2201/0471; H04N 1/00031; H04N 1/00063; H04N 1/58; H04N 2201/0426; H04N 2201/04791; H04N 2201/04793; H04N 2201/04796; H04N 1/00082; H04N 1/053; H04N 1/1013
USPC ........... 358/1.9, 2.1, 500, 400, 504, 406, 474, 358/3.06, 3.26; 382/275
See application file for complete search history.

(56) References Cited

U.S. PATENT DOCUMENTS

| | | | | |
|---|---|---|---|---|
| 8,189,937 | B2 * | 5/2012 | Okugawa | ............ 382/254 |
| 2009/0034029 | A1 | 2/2009 | Nakamura | |
| 2012/0154826 | A1 * | 6/2012 | Yamazaki | ............ 358/1.1 |

FOREIGN PATENT DOCUMENTS

| | | | |
|---|---|---|---|
| CN | 1392432 A | * | 1/2003 |
| CN | 1845014 A | | 10/2006 |
| CN | 101359204 A | | 2/2009 |
| CN | 101359205 A | | 2/2009 |
| JP | 2009-034865 A | | 2/2009 |

* cited by examiner

*Primary Examiner* — Thomas D Lee
*Assistant Examiner* — Stephen M Brinich
(74) *Attorney, Agent, or Firm* — Canon U.S.A., Inc. IP Division

(57) ABSTRACT

An image processing apparatus, when correcting image data using correction information, corrects skew of the image in the sub-scanning direction that is formed by the image forming unit by correcting the image data also at an end portion of an area where an image forming unit forms the image.

39 Claims, 7 Drawing Sheets

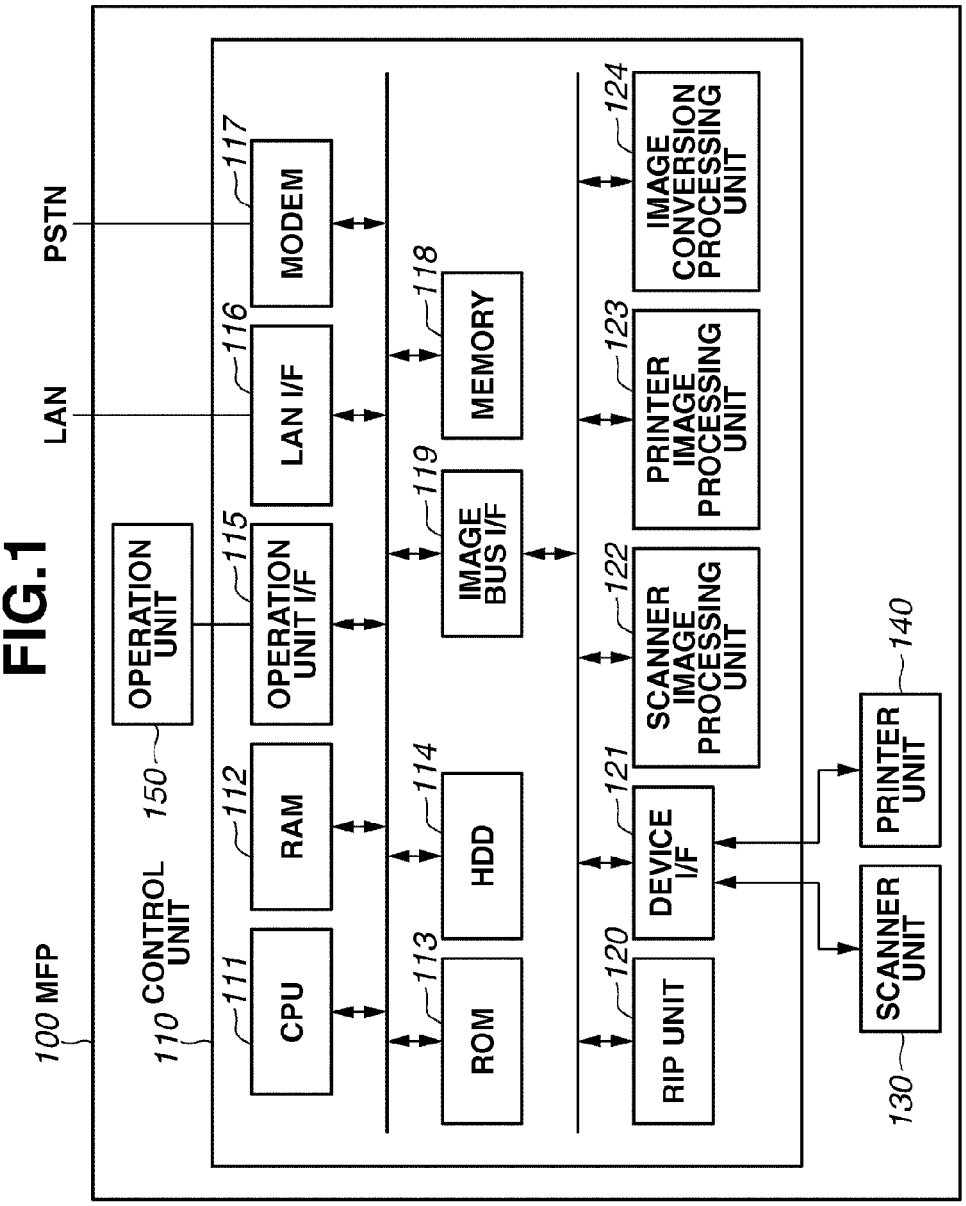

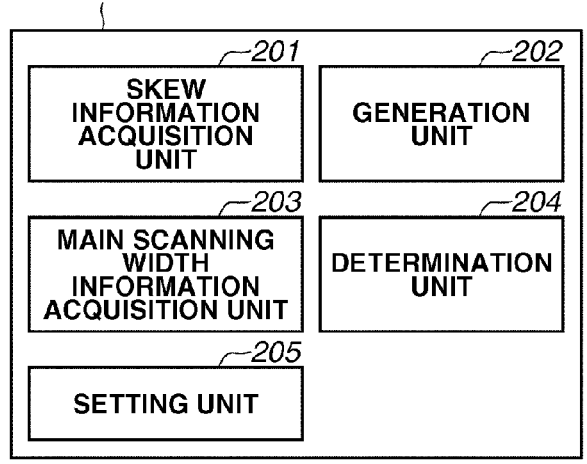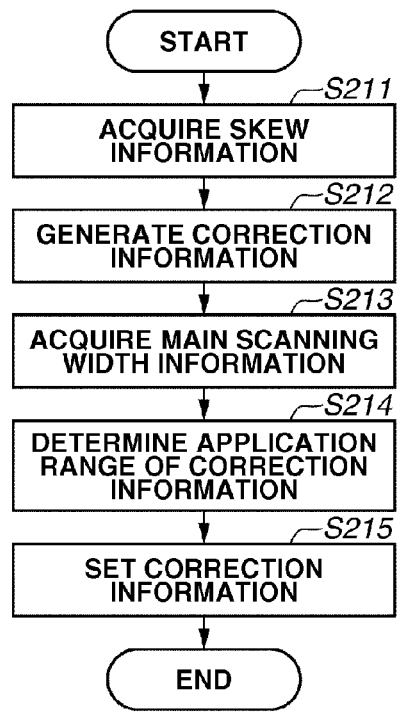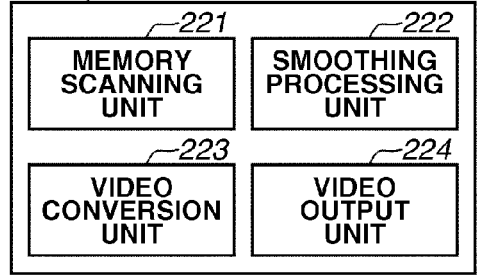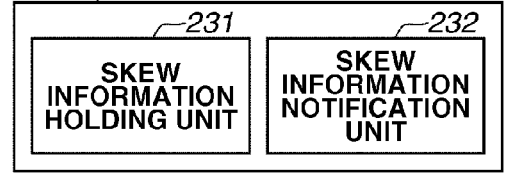

Figure 3F:
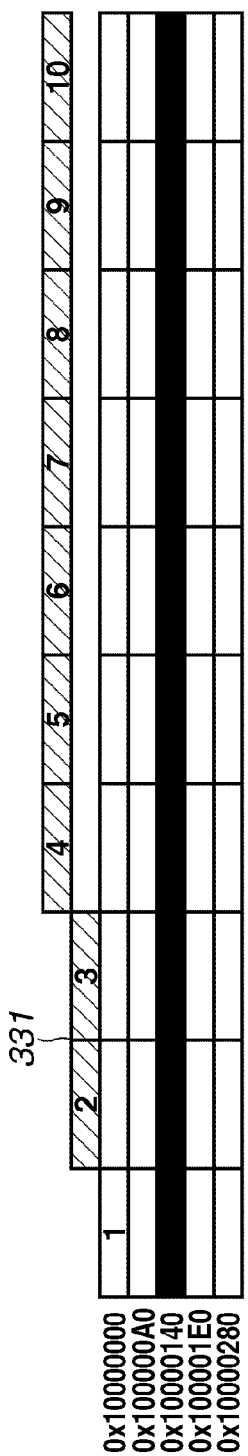

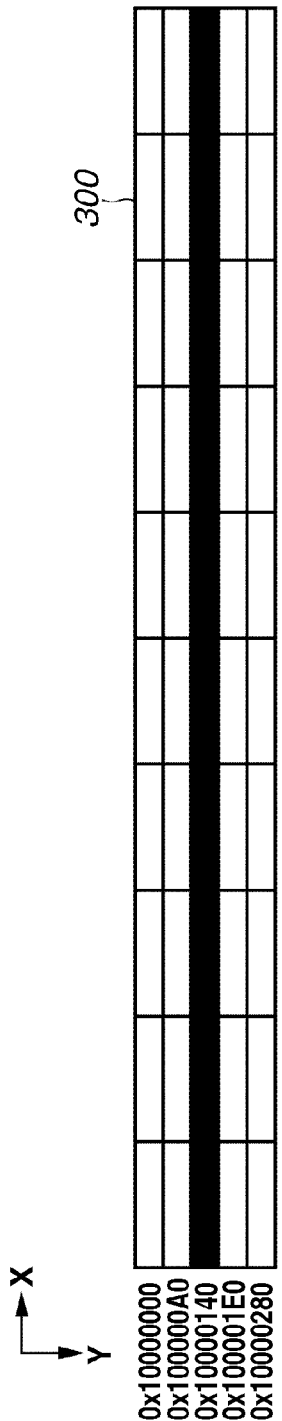
FIG.3A
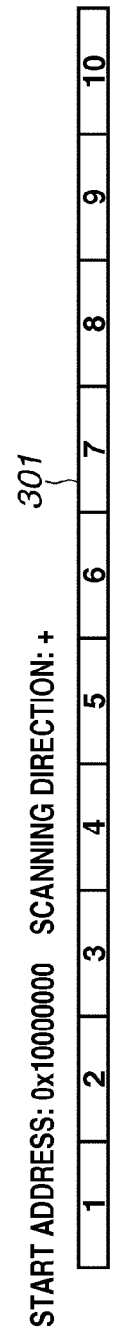
FIG.3B
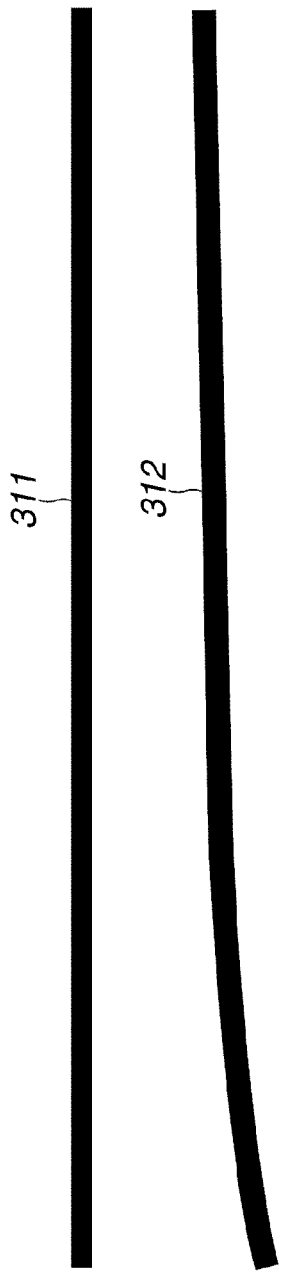
FIG.3C
FIG.3D
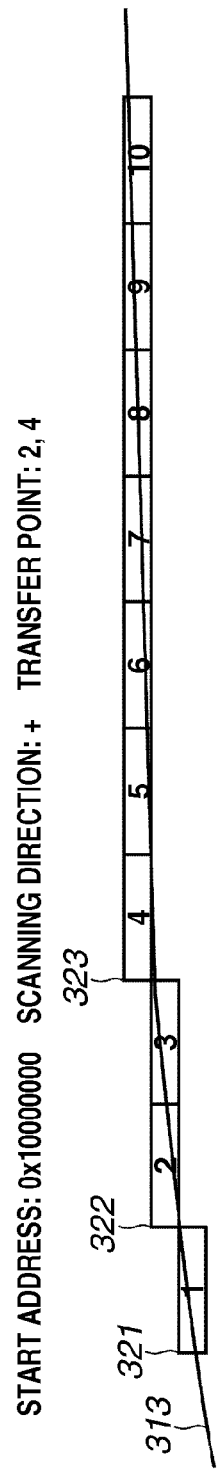
FIG.3E

IMAGE PROCESSING APPARATUS, IMAGE PROCESSING METHOD, AND COMPUTER-READABLE MEDIUM

BACKGROUND OF THE INVENTION

1. Field of the Invention

This invention relates to an image processing apparatus, an image processing method, and a computer-readable medium.

2. Description of the Related Art

An image processing apparatus is provided that forms an image by scanning and exposing a photosensitive member with a laser beam. Such an image forming apparatus deflects the laser beam by a rotating polygon mirror and scans the photosensitive member to perform exposure (exposure scanning) based on image data. A latent image formed by the exposure (exposure scanning) is developed to form an original image, which is transferred and fixed onto a recording medium such as paper. It is known that a color printer performs the above-described processing with a plurality of process color (e.g., yellow, magenta, cyan, and black) and superimposes the original images of each color to form a multiple color image on the recording medium.

In such an image forming apparatus, when the exposure is performed, due to skew of a scanning line (exposure scanning line) caused by plane tilt of the polygon mirror, the original image is skewed in a curved-line shape. On the other hand, Japanese Patent Application Laid-Open No. 2009-034865 discusses a technique for offsetting the skew of the formed original image by correcting (skew correction) the image data considering the skew of an exposure scanning line. Such skew correction is performed using correction information approximately representing the skew of the exposure scanning line in an area (also referred to as a "main-scanning width area") of a main-scanning direction in which the latent image is formed by the exposure scanning.

The skew correction discussed in Japanese Patent Application Laid-Open No. 2009-034865 includes line shifting processing and smoothing processing. In the line shifting processing, a centroid of the image data is displaced by a pixel unit by shifting the image data in a sub-scanning direction. In the smoothing processing, a pixel value of the image data is changed according to a position in a main-scanning direction to displace the centroid of the image data by less than a pixel unit. When the line shifting processing is performed a step height is generated before and after the pixel position where the line shifting processing is performed in the main-scanning direction. The smoothing processing determines a line shifting point by using the correction information to smooth the step height.

Printer engines (also referred to as "printer units" or "image forming units") have different maximum widths (main-scanning widths) in the main-scanning direction for forming the latent image by exposure scanning depending on a printer type. For example, a maximum width of the printer engine corresponds to an A3 size sheet or an A4 size sheet. The correction information is conventionally generated only for the main-scanning width of the printer engine by a soft module (correction information generation logic) which generates the correction information and the generated correction information can be used for the skew correction.

Out of the skew correction, the smoothing processing performs smoothing by determining whether there is a line shifting point based on the set correction information, to displace the centroid of the image data by less than a pixel unit. Therefore, depending on whether there is the line shifting point near an end portion of the main-scanning width of the printer engine, a correction result acquired by the skew correction varies. In other words, when the set correction information indicates that there is no line shifting point near the end portion of the main-scanning width where the skew of the exposure scanning line is to be offset by the smoothing processing, the smoothing processing is not performed and thus the appropriate skew correction is not performed.

As described above, when the generated correction information does not include the correction information about a wider area than the main-scanning width of the printer engine, the skew of the exposure scanning line cannot be sufficiently corrected near the end portion of the main-scanning width thereof.

SUMMARY OF THE INVENTION

An image processing apparatus according to the present invention corrects an image by displacing the image in a sub-scanning direction using correction information to offset skew of a scanning line in the sub-scanning direction caused by an image forming unit in exposure scanning. The image processing apparatus includes a generation unit configured to generate the correction information about an area including an area of the exposure scanning in a main-scanning direction based on skew information about the scanning line in the sub-scanning direction, and a correction unit configured to correct the image in an area of the exposure scanning in the main-scanning direction, using, out of the correction information generated by the generation unit, correction information about an area larger in the main-scanning direction than an area of the exposure scanning in the main-scanning direction.

According to the present invention, near an end portion of a main-scanning width of a printer engine, distortion of an image caused by the skew of an exposure scanning line can be corrected.

SUMMARY OF THE INVENTION

FIG. 1 is a system block diagram of an image processing apparatus of the present invention.

FIGS. 2A, 2B, 2C, and 2D illustrate examples of modules performing skew correction according to a first exemplary embodiment of the present invention.

FIGS. 3A, 3B, 3C, 3D, 3E, 3F, 3G, and 3H illustrate a memory scanning unit.

FIGS. 4A, 4B, 4C, and 4D illustrate an example of processing content of a generation unit.

FIGS. 5A, 5B, 5C, 5D, and 5E illustrate a smoothing processing unit.

Figure 6A:
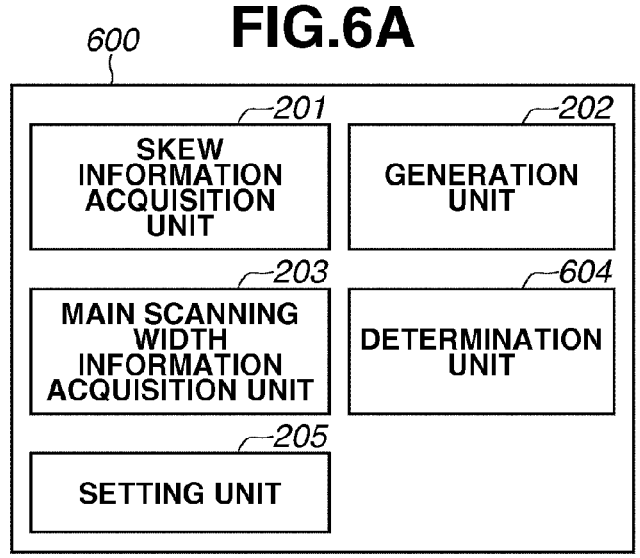
Figure 6B:
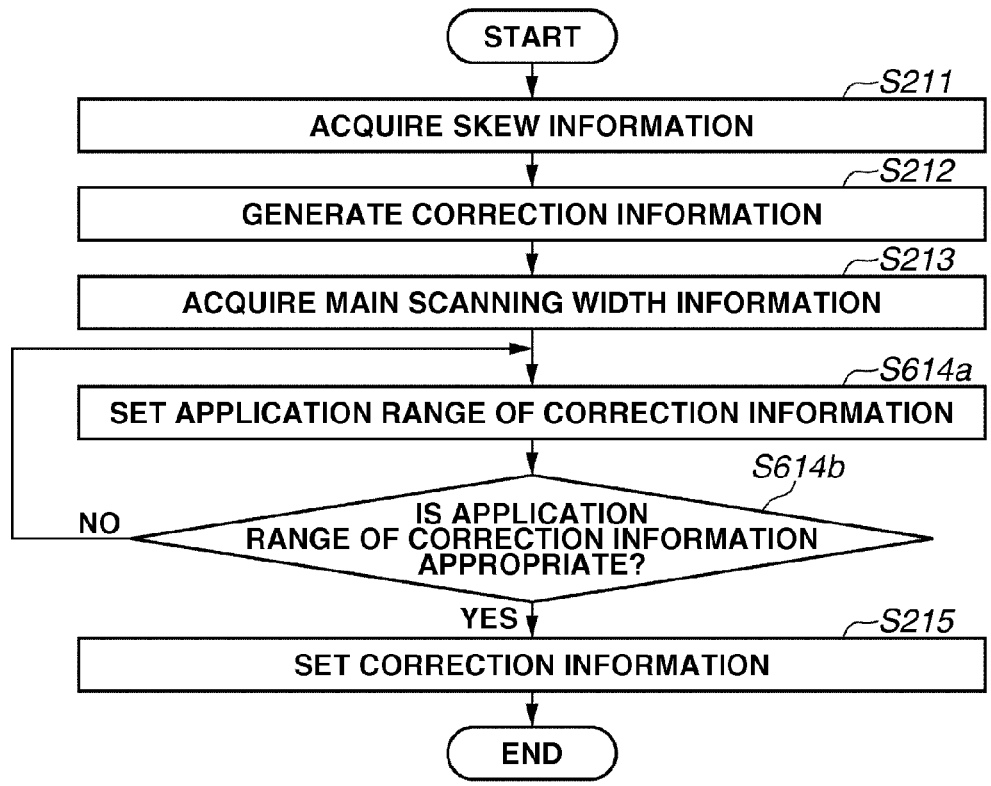

FIGS. 6A and 6B illustrate examples of modules performing skew correction according to a second exemplary embodiment.

DESCRIPTION OF THE EMBODIMENTS

[Image Processing Apparatus]

FIG. 1 is a system block diagram of a multi-function peripheral (MFP) 100 employed as an image processing apparatus according to a first exemplary embodiment. The MFP 100 includes a control unit 110, a scanner unit 130, a printer unit 140 (corresponding to an image forming unit), and an operation unit 150. The scanner unit 130 reads an original image and then transmits the read image data to the control unit 110.

The printer unit 140 performs image forming processing based on the image data received from the control unit 110.

The image forming processing according to the present exemplary embodiment is performed using an electro-photographic process, and forms a latent image by exposure-scanning a charged photosensitive member (not illustrated) with a laser (exposure unit), and then transfers and fixes the latent image developed by a development unit onto a recording medium (sheet such as recording paper).

The printer unit 140 functions as an image forming unit. In the description below, a scanning line of exposure scanning with the laser is referred to as an exposure scanning line. The present exemplary embodiment is not limited to the MFP but may also be applied to a printer including only a printer function. Further, a maximum exposure area in the main-scanning direction with the exposure scanning line corresponds to a maximum width (also referred to as an image forming area) of an area where an image is formed by the image forming unit.

The control unit 110 is connected with the scanner unit 130 that is an image input device and the printer unit 140 that is an image output device, to control input/output of image information. On the other hand, the control unit 110 can be connected to a host computer (not illustrated) via a network such as a local area network (LAN) and a public switched telephone networks (PSTN) and controls the input/output of image information including movie data and still image data, and device information to/from the host computer.

The control unit 110 includes processing units from a central processing unit (CPU) 111 to an image conversion processing unit 124. The CPU 111 controls an entire operation of the MFP 100 and performs an operation based on a program stored in a random access memory (RAM) 112.

The RAM 112 also functions as an image memory for temporary storing the image data. A read only memory (ROM) 113 is a boot ROM, and stores a boot program of a system. A hard disk drive (HDD) 114 stores system software, the image data, and a program for controlling an operation of the MFP 100.

The program stored in the HDD 114 is a computer program for realizing processing of a module and a flowchart illustrated in FIGS. 2 and 6, and includes a program to be executed by the CPU 111. The program stored in the HDD 114 is loaded into the RAM 112, and then the CPU 111 controls the operation of the MFP 100 based on the loaded program.

An operation unit interface (I/F) 115 is an interface connecting the operation unit 150 to the control unit 110, and outputs the image data to be displayed on the operation unit 150 to the operation unit 150. Further, the operation unit I/F 115 transmits information input by a user via the operation unit 150 to the CPU 111. A LAN I/F 116 and a modem 117 are connected to the LAN and the PSTN respectively, to perform the input/output of the image data and various kinds of information.

A memory 118 stores the still image data and other data, similarly to the HDD 114.

An image bus I/F 119 controls high-speed input/output of the image data via the image bus.

A raster image processor (RIP) unit 120 develops a page description language (PDL) received from the host computer (not illustrated) via the LAN and the LAN I/F 116, into a bit map image.

A device I/F 121 connects the scanner unit 130 and the printer unit 140 that are the image input/output devices, to the control unit 110 to convert the image data in a synchronous system/a non-synchronous system.

A scanner image processing unit 122 performs image correction on the image data read from an original by the scanner unit 130.

A printer image processing unit 123 performs the image correction on the image data to be output to the printer unit 140. More specifically, binary image data or multiple-valued image data stored in the HDD 114 or the memory 118 is halftone-processed for each color of process colors, and the image data in each color is converted into a video signal and then transferred to the printer unit 140.

The image correction for the skew correction according to the present exemplary embodiment is also performed by the printer image processing unit 123. An image conversion processing unit 124 performs image conversion on the image data stored in the HDD 114 or the memory 118. More specifically, processing such as rotation processing and resolution conversion processing is performed on the image. Further, the image conversion processing unit 124 performs processing for converting the binary image data into the multi-valued image data, and reversely the multi-valued image data into the binary image data.

[Skew Correction Processing]

FIGS. 2A, 2B, 2C, and 2D illustrate examples of modules performing skew correction processing according to the present invention.

FIG. 2A schematically illustrates a skew correction module 200 realized by developing in the RAM 112 a program for performing the processing of the flowchart illustrated in FIG. 2B. The program is stored in the HDD 114 and is executed by the CPU 111. The skew correction module 200 includes each unit illustrated in FIG. 2A.

FIG. 2B is a flowchart illustrating processing performed by the skew correction module 200.

In step S211, a skew information acquisition unit 201 acquires laser skew information indicating a level of skew of the exposure scanning line included in a skew information holding unit 231 of the printer unit 140, from a skew information notification unit 232. According to the present exemplary embodiment, as an example of laser skew information, a displacement amount (refer to FIG. 4A) in a sub-scanning direction of the exposure scanning line from a reference position, at a plurality of positions in the main-scanning direction will be described.

In step S212, a generation unit 202 generates correction information for a sufficiently large area in the main-scanning direction (also referred to as "correction information") based on the laser skew information acquired in step S211. The sufficiently large area in the main-scanning direction refers to an area in the main-scanning direction including an area in the main-scanning direction of the exposure scanning performed by the printer unit 140. The sufficiently large area is larger in the main-scanning direction than the area of the exposure scanning performed in the main-scanning direction by the printer unit 140. Details will be described with reference to FIG. 4.

In step S213, a main-scanning width information acquisition unit 203 acquires main-scanning width information about the printer engine. According to the present exemplary embodiment, the main-scanning width information about the engine refers to information indicating the main-scanning width information about the engine and previously held by the main-scanning width information acquisition unit 203 but not limited thereto.

In other words, the main-scanning width information about the engine may be held in the printer unit 140 and the main-scanning width information acquisition unit 203 may acquire (receive) the main-scanning width information from the printer unit 140. The printer unit 140 includes a notification unit which notifies the main-scanning width information acquisition unit 203 of the main-scanning width information about the engine.

As to the main-scanning width notification unit, the main-scanning width of the engine indicates the maximum width where printing can be performed in the main-scanning direction of the engine. The main-scanning width information acquisition unit 203 may acquire the main-scanning width information about the engine held by a holding unit of the printer unit 140 (not illustrated) from the holding unit. Details will be described with reference to FIG. 4.

In step S214, a determination unit determines an application area in the main-scanning direction of the correction information generated in step S212 based on the main-scanning width information about the engine acquired in step S213. The application area is determined based on the printer unit 140 and corresponds to an area in the main-scanning direction of the exposure scanning performed by the printer unit 140. Details will be described with reference to FIG. 4.

In step S215, a setting unit 205 specifies, of the correction information generated in step S212, the correction information within the area of the application area determined in the step S214, and then sets the correction information for the printer image processing unit 123. More specifically, the setting unit 205 stores the correction information within the application area into a register of an image processing chip (not illustrated) included in the printer image processing unit 123.

The correction information stored in the register is a part of the correction information generated in step S212. The correction information stored in the printer register is used for the skew correction performed by a memory scanning unit 221 and a smoothing processing unit 222 of the printer image processing unit 123. Details will be described with reference to FIGS. 3, 4, and 5.

FIG. 2C illustrates an example of a configuration of the printer image processing unit 123. FIG. 2C illustrates a processing unit performing the skew correction on the image that is stored (developed) in the memory 118 and has been halftone-processed, out of image processing performed by the printer image processing unit 123.

In other words, the memory scanning unit 221 scans the image data developed in the memory 118, and then the smoothing processing unit 222 performs smoothing processing on the scanned image data. Each processing performed by the memory scanning unit 221 and the smoothing processing unit 222 will be described with reference to FIGS. 3, 4, and 5.

A video conversion unit 223 converts the image data, on which the memory scanning unit 221 and the smoothing processing unit 222 have performed the skew correction, into a video signal.

A video output unit 224 outputs the video signal to the printer unit 140 via the device I/F 121.

FIG. 2D illustrates an example of a configuration of the printer unit 140. The printer unit 140 includes the skew information holding unit 231 storing the laser skew information and the skew information notification unit 232 notifying the skew information acquisition unit 201 in the skew correction module 200 of the laser skew information.

According to the present exemplary embodiment, an example in which the printer unit 140 including the skew information holding unit 231 and the skew information notification unit 232 is illustrated, however, the present invention is not limited thereto. For example, the skew information holding unit 231 and the skew information notification unit 232 may not be always included in the printer unit 140, but may be included in the RAM 112, the ROM 113, and the HDD 114 in the control unit 110, and further, may be mounted as one module which constitutes a program stored in the HDD 114.

[Line Shifting Processing]

The memory scanning unit 221 included in the printer image processing unit 123 will be described with reference to FIG. 3.

A memory image 300 illustrated in FIG. 3A schematically illustrates bitmap image data that is developed on the memory 118 and halftone-processed, and also the image data developed with an address 0x10000000 at the front. An X direction and a Y direction illustrated in FIG. 3A indicate the main-scanning direction and the sub-scanning direction respectively. The memory image 300 illustrated in FIG. 3A is an image having ten segments in the X direction and five lines in the Y direction, and includes one straight line extending in the main-scanning direction (X direction).

FIG. 3B schematically illustrates an example of setting of the memory scanning unit 221. Prior to starting memory scanning, the memory scanning unit 221 refers to a scanning start address and a scanning direction set by the setting unit 205 in step S215. The scanning start address is information indicating a location in a memory region for starting scanning.

Further, the scanning direction is information indicating whether scanning is performed in an address increasing (+ direction) direction or an address decreasing direction (− direction) from the scanning start address. In an example illustrated in FIG. 3B, the scanning start address "0x10000000" and the scanning direction "+ direction" are set. When the above described direction is set, the memory scanning unit 221 scans the image data from the scanning start address "0x10000000" in the + direction.

A plurality of segments 301 indicated in a rectangle illustrated in FIG. 3B indicates a unit of the image data that is accessed by the memory scanning unit 221. An access unit in the X direction (main-scanning direction) may be one pixel unit or a plurality of pixel unit, and according to the present exemplary embodiment, it is set to a 64-pixel unit. The access unit in the Y direction (sub-scanning direction) is set to a one-line unit. In other words, one segment includes the image data of 64×1 pixels.

The number indicated in each segment illustrated in FIG. 3B indicates an order of access by the memory scanning unit 221, and is set to be accessed in the same one line straight in the + direction from a segment 1 at a left end.

The memory scanning unit 221 scans straight the memory image 300 illustrated in FIG. 3A for each one line with the setting illustrated in FIG. 3B and outputs the scanned memory image to the printer unit 140. When the exposure scanning line has no skew, a straight line 311 as illustrated in FIG. 3C is output to the recording medium (e.g., a sheet such as recording paper).

However, due to the skew of the exposure scanning line caused by plane tilt of the polygon mirror of the printer unit 140, the straight line 311 may be output as a curve 312 as illustrated in FIG. 3D for example. A skew correction method will be described which offsets the skew of the exposure scanning line so that an output like the straight line 311 can be finally acquired in a case of the laser having the skewed exposure scanning line like the curve 312.

FIG. 3E illustrates an example of scanning setting of the correction information set for the printer image processing unit 123 by the setting unit 205 in step S215. A curve 313 indicates the exposure scanning line having the skew. The curve 312 illustrated in FIG. 3D is acquired by outputting the straight memory image 300 according to the exposure scanning line.

FIG. 3E illustrates the scanning setting including the line shifting point in addition to the start address and the scanning direction of the memory scanning unit 221 illustrated in FIG. 3B. More specifically, the scanning setting of the memory scanning unit 221 is made to scan by displacing each one line in the + direction or the − direction of the Y direction (sub-scanning direction) from a certain segment to perform scanning along the curve 312 indicating the exposure scanning line that is illustrated in a superimposing manner.

In other words, scanning the memory image is started at the front segment 321 and scanning is performed at positions of a segment 322 and a segment 323 in the X direction (main-scanning direction), by displacing each one line in the sub-scanning direction.

As described above, displacing the position (sub-scanning position) of the scan target segment in the sub-scanning direction by each one line is referred to as "line shifting" according to the present exemplary embodiment, and the position in the main-scanning direction (main-scanning position) on which the line shifting is performed is referred to as a "line shifting point" such as the segment 322 and the segment 323.

Processing for performing line shifting as described above is referred to as "line shifting processing". A method for generating a setting value of the line shifting processing as illustrated in FIG. 3E will be described with reference to FIG. 4.

FIG. 3F schematically illustrates a scanning position when a first line (line in the main-scanning direction where the scanning is started at the address of 0x10000000) in the memory image 300 is scanned with the scanning setting of the memory scanning unit 221 illustrated in FIG. 3E.

As illustrated in FIG. 3F, when the scanning is sequentially performed from a segment 1, as illustrated with a second segment 331, a segment including no image data of the memory image 300 can be scanned. When such a segment including no image data is scanned, an arbitrary data value can be set for the segment to be scanned.

In the present exemplary embodiment, data representing blank is set. Similar to the segment 331, the shaded segment illustrated in FIG. 3F transfers the data representing the blank.

Figure 3G:
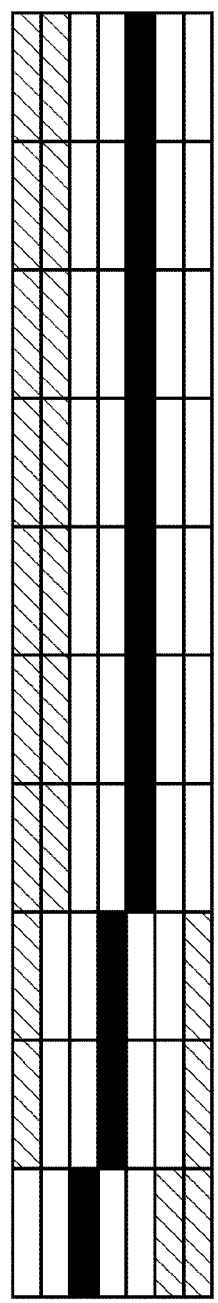

FIG. 3G schematically illustrates the image data that is acquired by scanning the entire memory image 300 by the memory scanning unit 221 as illustrated in FIG. 3E and output from the printer image processing unit 123 without performing the smoothing processing by the smoothing processing unit 222.

FIG. 3G is the image data that is corrected by bending in an opposite direction with respect to the sub-scanning direction in the scanning setting of the memory scanning unit 221 illustrated in FIG. 3E.

Figure 3H:

The printer image processing unit 123 performs printer image processing on the image data including shaded blank data and outputs the image data to the printer unit 140 via the device I/F 121. FIG. 3H schematically illustrates the image data illustrated in FIG. 3G that is output from the printer unit 140 and drawn with the laser. As illustrated in FIG. 3G, the image data corrected by bending in the opposite direction is output under the influence of the skew of the laser in the exposure scanning, and as a result, the image in which the skew of the curve 312 illustrated in FIG. 3D is offset is drawn.

By performing the line shifting processing as described above, the image processing for offsetting the skew of the exposure scanning line can be performed.

[Smoothing Processing]

The smoothing processing performed by the smoothing processing unit 222 will be described with reference to FIGS. 5A and 5B.

As illustrated in FIG. 3H, when the line shifting processing is performed, the line shifting point (line shifting step height) can be comparatively, easily recognized as step height. The smoothing processing unit 222 performs the smoothing processing on the line shifting point so that the line shifting point cannot be easily, visually recognized.

The smoothing processing according to the present exemplary embodiment is performed at the line shifting point based on the correction information set by the printer image processing unit 123. In the image data illustrated in FIGS. 5A and 5B according to the present exemplary embodiment, the correction information includes information indicating that the line shifting points are located at the main scanning points of segments 505 and 513.

When the smoothing processing is performed on the image data including two lines, the smoothing processing unit 222 determines that the line shifting point is located at the position of the segment 505. Near the line shifting point (e.g., an area illustrated in FIG. 5A), the smoothing processing unit 222 smoothes the line shifting step height by re-distributing the image data between the two lines adjacent to each other in the sub-scanning direction.

In the re-distribution processing of the image data, the values of the image data are distributed such that the centroid of the image data in the sub-scanning direction is displaced gradually along the main-scanning position near the line shifting point.

Figure 5A:
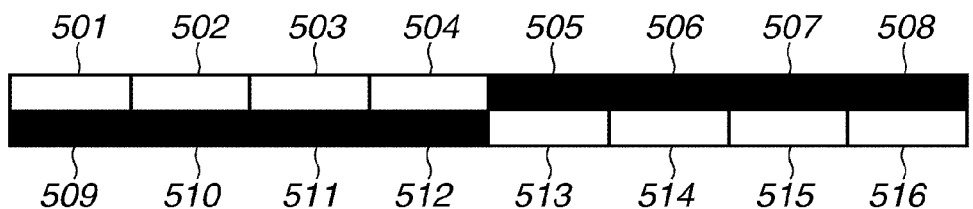

FIG. 5A schematically illustrates the image data that is acquired by scanning an image of a straight line developed on the memory by the memory scanning unit 221 and input into the smoothing processing unit 222. For example, if the smoothing processing is performed over an area of the segments 501 to 508 and the segments 509 to 516, as illustrated in FIG. 5B, the image data with the smoothed line shifting step height is output from the smoothing processing unit 222.

The image data output from the smoothing processing unit 222 can be simulated by using the correction information generated by the generation unit 202. According to the present exemplary embodiment, the simulated image data is referred to as a smoothing image. A curve 521 illustrated in FIG. 5B is an example of the smoothing image and referred to as a smoothing curve.

Prior to performing the smoothing processing, in an upper line, a density value (pixel value) is 0 from a first pixel (left end) of the segment 501 to a 64th pixel (right end) of the segment 504, and a density value is 15 from the first pixel of the segment 505 to the 64th pixel of the segment 508.

In a lower line, the density value (pixel value) is 15 from the first pixel (left end) of the segment 509 to the 64th pixel (right end) of the segment 504, and a density value is 0 from the first pixel of the segment 513 to the 64th pixel of the segment 516. The image data of one pixel has the density value in a range from 0 to 15.

The re-distribution processing of the image data is performed between the upper line and the lower line. In other words, the density values of the image data of the segments 509 to 512 in the lower line are distributed to the image data of the segments 501 to 504 at a left side of the line shifting point at a ratio determined based on the main-scanning position.

Further, the image data of the segments 505 to 508 at a right side of the line shifting point are distributed to the density values of the image data of the segments 509 to 512 in the lower line at the ratio determined based on the main-scanning position. As a result, in the upper line, total 512 pixels from the first pixel of the segment 501 to the 64th pixel of the segment 508 in the upper line are distributed such that the density gradually increases from 0 to 15.

For example, for the segment 501, the pixels from the first pixel to the 32nd pixel are distributed to have the density 0 and the pixels from the 33rd pixel to the 64th pixel are distributed to have the density 1. Further, for the segment 502, the pixels from the first pixel to the 32nd pixel are distributed to have the density 2 and the pixels from the 33rd pixel to the 64th pixel are distributed to have the density 1. In the lower line, similarly, the density values are distributed such that the density gradually decreases from 15 to 0.

In the smoothing processing described above, it becomes difficult to visually recognize the line shifting step height, and the more natural skew correction is realized.

[Skew Correction Module]

The above-described line shifting processing and smoothing processing uses the correction information set in step S215. The processing performed by the skew correction module 200 for setting the correction information will be described with reference to FIG. 4.

Figure 4A:
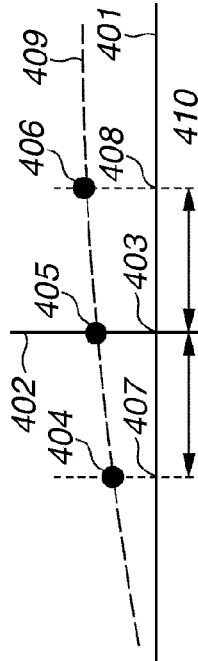
Figure 4B:
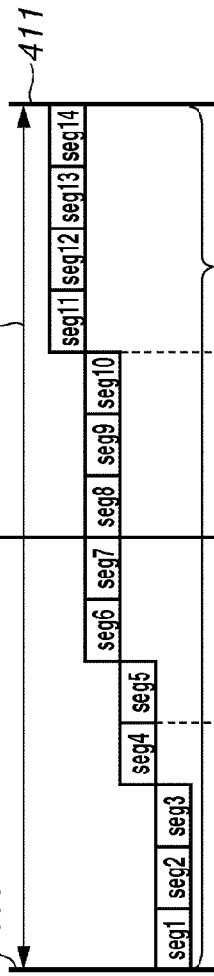
Figure 4C:
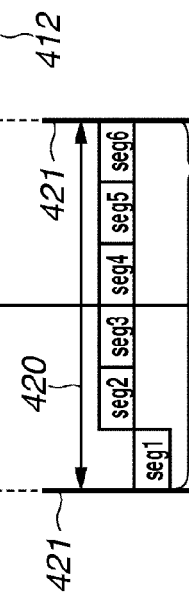

FIG. 4A illustrates an example of a process for generating an approximate curve approximating the skew of the exposure scanning line (hereafter, only referred to as an approximate curve) based on the laser skew information acquired by the skew information acquisition unit 201. FIGS. 4B and 4C schematically illustrates a generation result of the correction information about the engine having the different main-scanning width (a width 410 illustrated in FIG. 4B and a width 420 illustrated in FIG. 4C) with respect to the approximate curve illustrated in FIG. 4A.

Figure 4D:
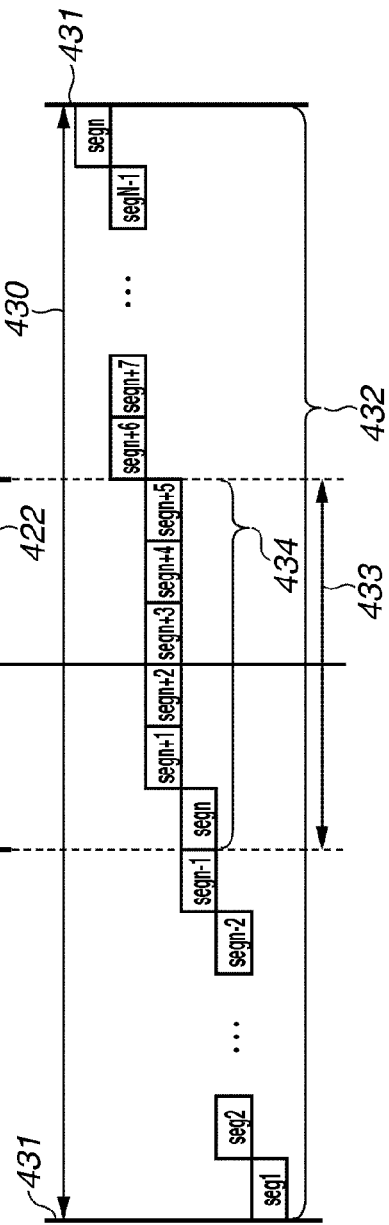

Further, FIG. 4D schematically illustrates a generation result of the correction information about a virtual engine having the main-scanning width (width 430 illustrated in FIG. 4D) larger than the main-scanning width illustrated in FIGS. 4B and 4C according to the present invention. FIGS. 4A, 4B, 4C, and 4D share a Y axis 402 extending in the sub-scanning direction, and also share X coordinates 407 and 408 located in a same distance from the X coordinate 403 indicating the position of the Y axis 402 in the main-scanning direction.

In FIG. 4A, the X axis 401 indicates the main-scanning direction and an ideal exposure scanning line. Further, the Y axis 402 indicates the sub-scanning direction that passes through a central position of the engine and is orthogonal to the X axis 401.

A point 403 indicates a cross point (original point) of the X axis 401 and the Y axis 402. The skew information holding unit 231 of the printer unit 140 holds values of the Y coordinates 404, 405, and 406 at X coordinates 407, 403, and 408 (in other words, displacement amount of the exposure scanning line in the sub-scanning direction) of the actual exposure scanning line of the X axis 401 that is the ideal exposure scanning line.

In step S211 illustrated in FIG. 2B, the skew information acquisition unit 201 of the skew correction module 200 acquires the values of the X coordinates 407, 403, and 408 and the Y coordinates 404, 405, and 406.

The generation unit 202 acquires the values of the X coordinates 407, 403, and 408 and the Y coordinates 404, 405, and 406 of the above-described three points, and based on the information of the values, the approximate curve 409 approximating the skew of the actual exposure scanning line is generated.

The generated approximate curve includes, for example, a quadratic curve $y=ax^2+bx+c$. FIGS. 4B, 4C, and 4D illustrate a result in which the generation unit 202 generates the correction information along the approximate curve 409 in the main-scanning width of the engine having the different width based on the generated approximate curve 409. The correction information can be in any format as long as it has a value that can be used for performing the skew correction (line shifting processing and smoothing processing).

For example, the correction information may include a value indicating a position of the line shifting point in the main-scanning direction and a displacement amount in a line unit in the sub-scanning direction. An engine having a width 410 illustrated in FIG. 4B is defined as an engine A and an engine having a sub-scanning width 420 indicated illustrated in FIG. 4C is defined as an engine B, and an engine having the sub-scanning width 430 illustrated in FIG. 4D is defined as a virtual engine.

The virtual engine is not an actual printer engine (hereafter, referred to as an "engine") having a substance but is a simulated engine on a program of the software. Difference in the main-scanning width of the engine is referred to as difference in the type of the engine.

With reference to FIGS. 4B, 4C, and 4D, the correction information about the different engines (e.g., setting the line shifting point set in step S215) will be described.

For example, when the engine (defined as an engine A) illustrated in FIG. 4B has the main-scanning width of the width 410, the correction information appropriate to the engine A is correction information 412 from segments 1 to 14 illustrated in FIG. 4B. A main-scanning end portion 411 indicates the main-scanning end portion of the correction information about the engine A.

More specifically, as illustrated in FIG. 4B, the main-scanning end portion of the correction information 412 in the engine A is located from an leading end side of the segment 1 in the main-scanning direction to a rear end side of the segment 14 in the main-scanning direction. According to the present exemplary embodiment, the width 410 is equal to the main-scanning width of the engine A. However, the width 410 may be equal to the main-scanning width of the engine A or more since the skew correction can be performed on the main-scanning width of the engine A.

FIG. 4C illustrates the correction information 422 in the engine (engine B) having the width 420 which is different from that of the engine A with respect to the approximate curve 409 illustrated in FIG. 4A. According to the present exemplary embodiment, the width 420 is set equal to the main-scanning width of the engine B.

The correction information appropriate to the engine B is the correction information 422 from the segments 1 to 6 illustrated in FIG. 4C. At this point, the main-scanning end portion 421 of the correction information about the engine B is located from the leading end side of the segment 1 in the main-scanning direction to the rear end side of the segment 6 in the main-scanning direction.

Since the area of the correction information appropriate to the engine A is different from the information appropriate to the different engine B. Therefore, when a correction information generation logic is designed for each engine type, a software module appropriate to each engine type needs to be mounted, thereby increasing a development cost.

In step S212, as illustrated in FIG. 4D, based on the laser skew information acquired in step S211, the correction information generation logic according to the present exemplary embodiment generates correction information 432 about the virtual engine (engine C) having the width 430 as the main-scanning width.

In other words, the generation unit 202 generates the correction information 432 with respect to an area (width 430) including areas of the main-scanning widths (width 410 and width 420) of the engines A and B based on the laser skew information. An area 2 including an area 1 is larger than the area 1.

More specifically, the correction information 432 is the correction information about each segment from the segment 1 to a segment N in FIG. 4D.

In step S214, based on the main-scanning width information about the engine acquired in step S213, the determination unit 204 determines a correction information application area 433 (width 433) within the area of the main-scanning width 430 of the engine C to acquire the correction information about the engine.

For example, a case where the correction information about the engine B is acquired will be described. The determination unit 204 receives the main-scanning width information (corresponding to the width 420) about the engine B illustrated in FIG. 4C via the main-scanning width information acquisition unit 203.

The determination unit 204 acquires the area based on the received main-scanning width information about the engine B as the correction information application area 433 and the correction information 432 in the correction information application area 433 as correction information 434. More specifically, the determination unit 204 functions also as an acquisition unit for acquiring, as the correction information 434, the correction information in the area corresponding to the area of the main-scanning width of the engine B, out of the correction information 432.

More specifically, the correction information 432 is acquired from a segment "n" to a segment n+5 as the correction information 434. In step S215, as the correction information of the engine B, the correction information 434 is set to the printer image processing unit 123 by the setting unit 205. By using the correction information 434 set as described above, the printer image processing unit 123 of the MFP 100 including the engine B can perform the appropriate skew correction in the area of the main-scanning width of the engine B.

As described above, the skew correction module 200 sets the correction information appropriate to the engine B to the printer image processing unit 123 including the engine B. Based on the set correction information, the printer image processing unit 123 performs the line shifting processing and the smoothing processing appropriate to the engine B on the image.

It is obvious that the correction information can be set by the same method to the printer image processing unit 123 of the MFP 100 including the engine A. In such a case also, based on the set correction information, the printer image processing unit 123 can perform the line shifting processing or the smoothing processing appropriate to the engine A on the image.

As described above, the image processing apparatus including the correction information generation logic according to the present exemplary embodiment can set the appropriate correction information also to the printer image processing unit 123 of the MFP 100 including the engine having the different sub-scanning width due to difference of the engine type.

In other words, the correction information generation logic according to the present exemplary embodiment can be applied to the MFP having the different engine type, and thus the correction information generation logic, which has been designed and constructed for each engine type, can be commonly used for any engine type. As a result, the development costs can be reduced.

Smoothing processing according to a second exemplary embodiment will be described below. The smoothing processing according to a second exemplary embodiment takes account of the skew of the exposure scanning line generated outside the area in addition to the area within which the skew correction is performed in the main-scanning direction. Unless otherwise specified, the image processing apparatus of the present exemplary embodiment has the same configuration as the first exemplary embodiment.

The area where the skew correction is performed in the main-scanning direction (correction area) is the same as the main-scanning width of the engine, and the skew correction including the smoothing processing is performed using the correction information in the area equal to the main-scanning width of the engine. In such smoothing processing, since the correction information within the area equal to the main-scanning width of the engine is used, at the end portion of the area where the smoothing processing is performed in the main-scanning direction, an approximation error of the correction value for performing the smoothing processing could be generated.

More specifically, the conventional correction information generation logic generates the correction information within the correction area. In other words, the correction information generation logic stops generation of the correction information at the end portion (end portion 531 illustrated in FIG. 5C) of the correction area and sets the generated correction information to the printer image processing unit 123. The printer image processing unit 123 performs the smoothing processing based on the set correction information.

Figure 5B:
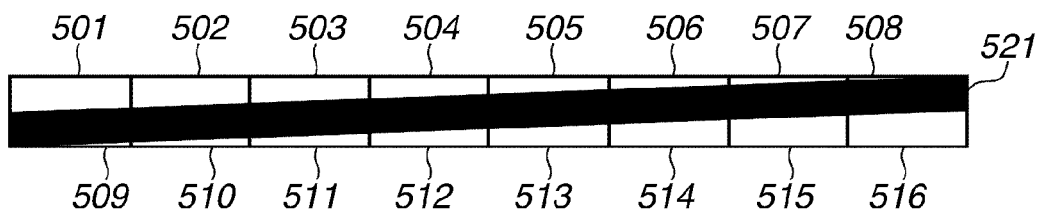
Figure 5C:
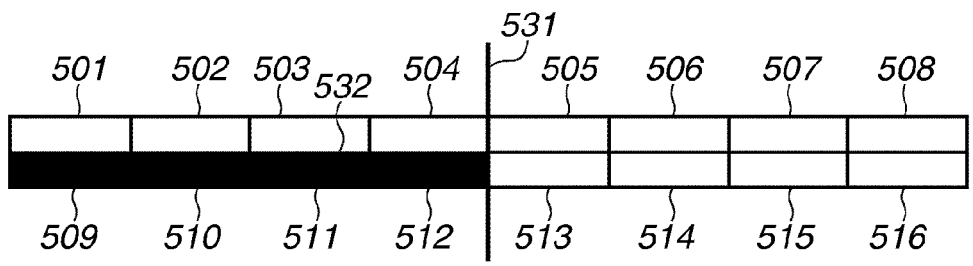

In other words, the printer image processing unit 123 does not take account of the correction information outside the area of the main-scanning width of the engine (right side of the end portion 531 illustrated in FIG. 5C).

When the main-scanning positions of the segment 505 and 513 illustrated in FIG. 5C are the line shifting points, and the generation of the correction information is stopped at the end portion 531, the generated correction information does not include information indicating that the main-scanning positions of the segments 505 and 513 are the line shifting points. In other words, the correction information indicates that the line shifting point is not located in the area of the segments 501 to 504, and 509 to 512.

Figure 5D:
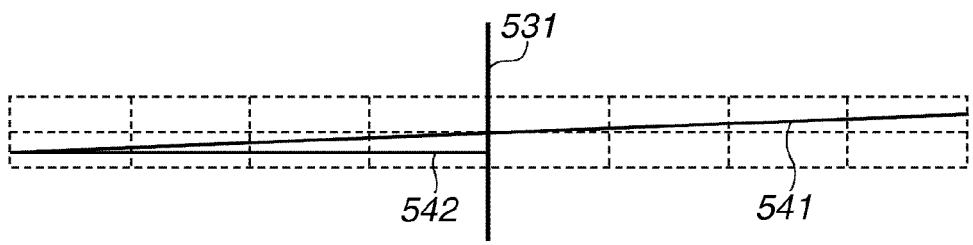

As a result, as illustrated in FIG. 5D, in the smoothing processing, difference (approximation error) is generated between the approximate curve (hereafter, referred to as an "approximate curve") approximating the skew of the exposure scanning line and the curve of the actual exposure scanning. The generated approximation error could affect the image toward a center direction, thereby disturbing the whole image from being improved.

According to the method described in the first exemplary embodiment, the appropriate correction information can be set to the printer image processing unit 123 of the MFP 100 including the engine having the different main-scanning width. The present exemplary embodiment will extend the method of the first exemplary embodiment. According to the present exemplary embodiment, in addition to the effects of the first exemplary embodiment, the correction information can be acquired that enables the smoothing processing which takes account of the skew of the exposure scanning line outside the area of the main-scanning width of the engine.

[Approximation Error based on Application Area of Correction Information]

With reference to FIG. 5, the present exemplary embodiment will be described in detail herebelow.

FIG. 5A described in the first exemplary embodiment schematically illustrates the image data to be input into the smoothing processing unit 222 after the line shifting processing is performed. As described in the first exemplary embodiment, FIG. 5B illustrates the smoothing processing performed on the image data of FIG. 5A over the area from the segments 501 to 508 and the segments 509 to 516.

The smoothing processing illustrated in FIGS. 5A and 5B is performed using the correction information set based on the main-scanning width of the engine A as described in the first exemplary embodiment. For example, the smoothing processing is performed over the area of the segments 7 to 14 as described with reference to FIG. 4B.

FIG. 5C schematically illustrates the image data when the main-scanning width of the engine is smaller than the main-scanning width of the engine illustrated in FIG. 5A. This image data includes the data of a straight line 532. It is presumed that the positions of the segments 504 and 512 are located at the end portion (main scanning end portion 531) of the area of the main-scanning width of the engine.

For example, the end portion 531 illustrated in FIG. 5C corresponds to the main-scanning end portion 421 at a right side of the engine B illustrated in FIG. 4C. In this case, the correction information about the area which is based on the end portion 531 is set to the printer image processing unit 123.

In other words, the correction information about the area outside the end portion 531 is not set to the printer image processing unit 123. The correction information about the area based on the end portion 531 indicates that the line shifting point is not located in the area of the segments 501 to 504 and the segments 509 to 512.

In such a case, the smoothing processing unit 222 performs the processing on the area of the segments 501 to 504 and the segments 509 to 512 using the set correction information. Since the set correction information indicates that the line shifting point is not located within the area of the segments 501 to 504 and the segments 509 to 512, the smoothing processing unit 222 determines that the line shifting step height is not generated within the area, and thus does not perform the smoothing processing.

As a result, the image data output from the smoothing processing unit 222 includes the straight line 532. For convenience sake of description, the image data of the straight line 532 that is simulated from the correction information is referred to as the smoothing curve 532.

The centroid positions of a smoothing curve 521 (refer to FIG. 5B) and the smoothing curve 532 are schematically illustrated in FIG. 5D. The centroid position of the smoothing curve 521 is represented by a centroid curve 541, and the centroid positions of the smoothing curve 532 is represented by a centroid curve 542. A margin of an error between the centroid curve 541 and the centroid curve 542 at the position of the end portion 531 is about ⁄1;2 pixel, which is about 21 micrometers in 600 dpi.

More specifically, setting of the correction information to the printer image processing unit 123 is stopped at the end portion 531 and the smoothing curve 532 having the approximation error of about 21 micrometers with respect to the smoothing curve 521 is output.

As a result, the approximation error of about 21 micrometers is generated in the image of one color plate (e.g., cyan plate). Thus, when the smoothing curves each having the approximation error of about 21 micrometers between the different two colors (e.g., cyan plate and magenta plate) is output, color displacement between the two colors are about 42 micrometers.

Namely, the color displacement that can be clearly, visually recognized is generated which deteriorates image quality. Further, the displacement caused by the approximation error spreads toward the center direction in the main-scanning direction of the image, and thus, the image quality of the whole image is affected which causes the color displacement over the whole image in addition to the main-scanning end portion.

With reference to FIG. 6A, in place of the determination unit 204 according to the first exemplary embodiment, the image processing apparatus according to the present exemplary embodiment includes a determination unit 604 in the skew correction module 200. The determination unit 604 simulates the smoothing image based on the correction information to determine an area (setting area) for setting the correction information. The processing (steps S614a and S614b illustrated in FIG. 6) performed by the determination unit 604 will be described herebelow.

[Setting Correction Information Application Area]

Figure 5E:
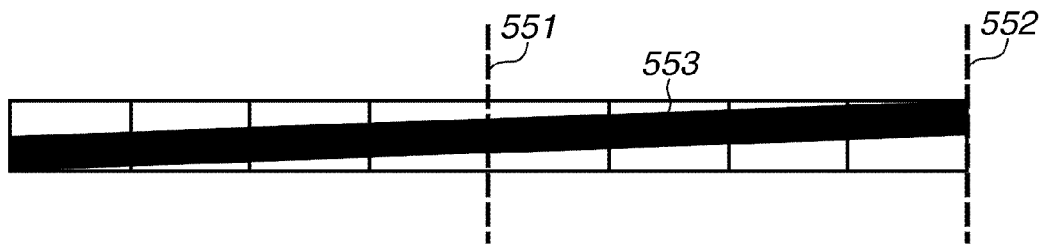

As illustrated in FIG. 5E, when the end portion of the engine main-scanning width acquired by the main-scanning width information acquisition unit 203 is located at the end portion 531, in step S614a, the determination unit 604 according to the present exemplary embodiment sets the area specified based on the end portion 531 as the correction information application area (the correction information application area 433 in the example illustrated in FIG. 4D).

It is determined whether the line shifting point is located at the end portion more rearward (right side in the example illustrated in FIG. 5E, in other words, outside an exposure area in the main-scanning direction) in the main-scanning direction than the position of the end portion 531 in the main-scanning direction. When the line shifting point is included, the determination unit 604 determines the line shifting point as an end portion 552.

When the line shifting point is not included, then in step S614a, the determination unit 604 determines as the end portion 552 the position (main scanning end portion 431 in the example illustrated in FIG. 4D) of the end portion of the main-scanning width of the virtual engine (refer to FIG. 4D). As described above, the processing extending rearward the position of the end portion in the main-scanning direction is described. Similarly, the tip side includes the end portion 531 and the end portion 552, and the determination unit 604 similarly sets the position of the end portion.

The area specified based on the end portion 531 refers to the area between the main scanning end portions 531 set at both ends in the main-scanning direction. The area specified based on the end portion 552 is similarly set.

Subsequently, the determination unit 604 determines whether the correction information corresponding to the set correction information application area (correction information application area 433 in the example illustrated in FIG. 4D) is appropriate as a setting value to be set to the printer image processing unit 123.

In other words, in step S614b, the determination unit 604 determines validity of the correction information application area. In the determination processing, the determination unit 604 simulates the smoothing curve 532 based on the correction information application area.

More specifically, the determination unit 604 generates the value of the difference between the Y coordinates of the centroid curve 541 and the centroid curve 542 at the end portion 531. The determination unit 604 holds a threshold value for determining validity of the approximation error and compares the approximation error with the threshold value to determine the validity of the correction information.

When the approximation error is equal to the threshold value or less, the correction information is determined to be appropriate. When it is determined it is not appropriate, then in step S614a, the determination unit 604 expands the correction information application area by a predetermined amount (e.g., four segments).

In step S614b, the determination unit 604 simulates again (re-simulates) the smoothing curve 532 using the correction information in the expanded correction information application area. The determination unit 604 generates the approximation error of the re-simulated smoothing curve with respect to the smoothing curve 553 at the end portion 531 to determine the validity of the correction information application area.

The step is repeatedly performed, and the determination unit 604 determines the correction information application area in which the approximation error is determined to be equal to the threshold value or less. The correction information about the virtual engine in the determined correction information application area is set to the printer image processing unit 123 by the setting unit 205. Post processing after the correction information is set is similar to that of the first exemplary embodiment.

[Skew Correction Module]

FIG. 6 illustrates an example of a module performing the skew correction processing according to the present invention.

FIG. 6A schematically illustrates a processing block of a skew correction module 600. The processing block shows how a program for realizing a series of processing flows illustrated in FIG. 6B stored in the HDD 114 is expanded into the RAM 112 to be executed by the CPU 111. The processing units in FIG. 6A having the same number as FIG. 2A have a same configuration as each processing of FIG. 2A.

FIG. 6B is a flowchart illustrating the processing performed by the skew correction module 600. The processing steps in FIG. 6B having the same step number as FIG. 2B will not be described in detail, since the processing step similar to FIG. 2B will be performed. FIGS. 6A and 6B will be described below.

In step S211, the skew information acquisition unit 201 acquires the laser skew information.

In step S212, the generation unit 202 generates the correction information about the virtual engine based on the laser skew information acquired in step S211.

In step S213, the main-scanning width information acquisition unit 203 acquires the main-scanning width information about the engine.

In step S614a, as described with reference to FIG. 5E, the determination unit 604 sets the correction information application area.

In step S614b, the determination unit 604 determines the validity of the correction information application area set in step S614a. The details of the determination method are as described above with reference to FIG. 5E.

When the correction information application area is valid (YES in step S614b), and then in step S215, the setting unit 205 sets the correction information to the printer image processing unit 123. When it is not valid (NO in step S614b), and then in step S614a, the correction information application area is changed and expanded. The method for changing the correction information application area is as described above.

The post processing after the correction information is set is similar to that of the first exemplary embodiment, and based on the set correction information, the printer image processing unit 123 performs the correction (line shifting processing and smoothing processing) on the image data, and then outputs the corrected image data to the printer unit 140.

According to the processing flow of the present exemplary embodiment described with reference to FIG. 6, by repeatedly performing steps S614a and S614b, the correction information application area is determined. However, the correction information about the virtual engine C having the main-scanning width that is sufficiently large and generated in S212 may be set to the printer image processing unit 123 in step S215 without performing the processing in steps S614a and S615b.

Alternatively, the correction information about the area specified by the end portion 552 set in steps S614a may be set in step S215 without performing the determination in step S615b.

As described above, according to the present exemplary embodiment, the area to which the correction information is applied (correction information application area) can be adjusted. With the adjustment, the approximation error in the main-scanning end portion and the approximation error spread toward the image center direction can be reduced, thereby improving the image quality.

According to the above described exemplary embodiment, the skew correction modules 200 and 600 are realized when the CPU 111 of the MFP 100 executes the program, the present invention is not limited thereto. According to the third exemplary embodiment, the skew correction modules 200 and 600 may be realized on a host computer (not illustrated) connected via a network including, for example, the MFP 100 and the LAN.

In such a case, the HDD, RAM, and ROM included in the host computer are used, and the CPU included in the host computer executes the program for realizing the skew correction module 200.

Further, in a system performing the skew correction processing (refer to FIGS. 2B and 6B) in such a host computer, before the host computer executes the skew correction processing, the host computer executes the processing equivalent to the processing performed by the RIP unit 120 of the MFP 100 and the printer image processing unit 123 in the above-described first and second exemplary embodiments. The host computer transmits the image data on which the skew correction processing is performed, to the MFP 100 via the network such as the LAN. The MFP 100 that has received the processed image data forms the image with the printer unit 140.

According to the present exemplary embodiment, the laser skew information is held by the skew information holding unit 231 of the printer unit 140 and acquired by the skew information acquisition unit that is realized on the host computer. Similarly, the main-scanning width acquisition unit on the host computer acquires the engine main-scanning width from the engine main-scanning width information holding unit (not illustrated) of the printer unit 140.

As described above, when the host computer executes the skew correction, an operation processing ability of the CPU of the host computer can be effectively utilized. Since the host computer performs the skew correction, an inexpensive MFP or printer that does not include such processing function can form the image on which the skew correction is performed.

Other Exemplary Embodiment

According to the above-described exemplary embodiment, the image data is corrected for a pixel unit in the sub-scanning direction by the line shifting processing when the image data is read from a memory. However, the present invention is not limited to the exemplary embodiments described above. The sub-scanning direction may be corrected for a pixel unit when the image data is written into the memory, instead of when the image is read from the memory.

Further, according to the above-described exemplary embodiment, the re-distribution processing of the image data in the smoothing processing is performed between two pixels adjacent to each other in the sub-scanning direction so that the pixel value on a certain line is gradually increased or decreased along the main-scanning direction. However, the present invention is not limited to the exemplary embodiment described above.

For example, the image data in the area on which the smoothing processing is performed can be divided into a plurality of section in the main-scanning direction, and an available pixel value in each section can be a binary value of 0 or 15. In such a case, between the two lines adjacent to each other in the sub-scanning direction, a ratio of pixels having the pixel value of 15 within a section on the upper line may be gradually increased and the ratio of pixels having the pixel value of 15 within a section on the lower line may be gradually decreased.

As a result, in the whole area on which the smoothing processing is performed, the correction can be performed for less than a unit pixel in the sub-scanning direction. Therefore, the present invention can be applied to a binary printer for forming a latent image according to whether to perform the exposure by the laser beam.

Further according to the exemplary embodiment described above, the smoothing processing is performed after the line shifting processing is performed. However, the transform processing may be performed after the smoothing processing is performed.

In the above-described exemplary embodiment, as an example, the image forming apparatus employing an electrophotographic process is described in which the photosensitive member is exposed with the laser beam to form the image. However, the present invention can be also applied to the image forming apparatus such as an ink jet printer which forms the image by causing developer such as a plurality of types of ink to impact on the sheet such as paper from a printer head to form the image.

In such a case, for example, the laser skew information described in the above-described exemplary embodiment shows displacement of an impact position of the developer caused by an error in assembling a printer head. The relevant description can be appropriately replaced depending on configuration of the ink jet printer.

Further, the present invention can be realized by performing the processing described below. The processing supplies the software (program) realizing the function of the above-described exemplary embodiment to the system or the apparatus via a network or various types of the storage mediums, and then the computer (or CPU or MPU) of the system or the apparatus reads the program to perform it.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-249858 filed Nov. 15, 2011, which is hereby incorporated by reference herein in its entirety.

What is claimed is:

1. An image processing apparatus that processes image data to form an image by an image forming unit, the image processing apparatus comprising:
    a generation unit configured to generate correction information to offset displacement of an image formed by the image forming unit in a sub-scanning direction;
    a determination unit configured to determine an application area in the main-scanning direction of the correction information based on a main-scanning width of the image forming unit;
    a first correction unit configured to perform correction by line shifting of the image data in the sub-scanning direction at a position in a main-scanning direction based on the correction information defined by the application area;
    a second correction unit configured to perform correction of pixel values of the image data based on the correction information defined by the application area to smooth line shifting step height generated by the correction performed by the first correction unit based on the correction information defined by the application area; and
    a transmission unit configured to transmit to the image forming unit the image data corrected by the first and second correction unit.

2. The image processing apparatus according to claim 1, wherein the determination unit determines the application area to be an area wider than the main-scanning width of the image forming unit.

3. The image processing apparatus according to claim 2, wherein the determination unit determines whether the application area is valid, and expands the application area in a case where the application area is determined to be not valid.

4. The image processing apparatus according to claim 3, wherein the determination unit determines the application area is not valid in a case where an approximation error at end portion in the main-scanning direction of an area where the image forming unit forms the image is larger than a threshold.

5. The image processing apparatus according to claim 4, wherein the determination unit obtains the approximation error by simulating a smoothing image based on the correction information defined by the application area.

6. An image processing method for processing image data to form an image by an image forming unit, the image processing method comprising:
    generating correction information to offset displacement of an image formed by the image forming unit in a sub-scanning direction;
    determining an application area in the main-scanning direction of the correction information based on a main-scanning width of the image forming unit;

correcting by line shifting of the image data in the sub-scanning direction at a position in a main-scanning direction based on the correction information defined by the application area;
  correcting pixel values of the image data based on the correction information defined by the application area to smooth line shifting step height generated by the correction performed by the first correction unit; and
  transmitting to the image forming unit the image data corrected by the first and second correction.

7. The image processing method according to claim 6, wherein the application area is determined to be an area wider than the main-scanning width of the image forming unit.

8. The image processing method according to claim 7, wherein it is determined whether the application area is valid, and the application area is expanded in a case where the application area is determined to be not valid.

9. The image processing method according to claim 8, wherein the application area is determined to be not valid in a case where an approximation error at end portion in the main-scanning direction of an area where the image forming unit forms the image is larger than a threshold.

10. The image processing method according to claim 9, wherein the approximation error is obtained by simulating a smoothing image based on the correction information defined by the application area.

11. A non-transitory computer-readable storage medium storing a program for causing at least one processor to execute an image processing method for forming an image by an image forming unit, the image processing method comprising:
  generating correction information to offset displacement of an image formed by the image forming unit in a sub-scanning direction;
  determining an application area in the main-scanning direction of the correction information based on a main-scanning width of the image forming unit;
  correcting by line shifting of the image data in the sub-scanning direction at a position in a main-scanning direction based on the correction information defined by the application area; and
  transmitting to the image forming unit the corrected image data.

12. The non-transitory computer readable medium according to claim 11, wherein the application area is determined to be an area wider than the main-scanning width of the image forming unit.

13. The non-transitory computer readable medium according to claim 12, wherein it is determined whether the application area is valid, and the application area is expanded in a case where the application area is determined to be not valid.

14. The non-transitory computer readable medium according to claim 13, wherein the application area is determined to be not valid in a case where an approximation error at end portion in the main-scanning direction of an area where the image forming unit forms the image is larger than a threshold.

15. The non-transitory computer readable medium according to claim 14, wherein the approximation error is obtained by simulating a smoothing image where line shifting step height generated by the correction is smoothed based on the correction information defined by the application area.

16. An image processing apparatus comprising:
  a first obtaining unit configured to obtain correction information of a first range in a main-scanning direction to correct displacement in a sub-scanning direction of an image formed by an image forming unit;
  a second obtaining unit configured to obtain range information corresponding to a second range in the main-scanning direction in which the image is formed by the image forming unit, the second range being narrower than the first range;
  a determination unit configured to determine a part of the obtained correction information, on a basis of the obtained range information; and
  a correction unit configured to perform correction on image data by shifting the image data in the sub-scanning direction on a basis of the determined part of the obtained correction information.

17. The image processing apparatus according to claim 16, wherein a third range in the main-scanning direction corresponding to the determined part of the obtained correction information is narrower than the first range and wider than the second range, and
  wherein the image processing apparatus comprises another correction unit configured to perform correction of pixel values of the image data on the basis of the determined part of the obtained correction information to smooth a step generated by the correction performed by the first correction unit.

18. The image processing apparatus according to claim 17, wherein the determination unit comprises:
  a first unit configured to determine a range in the main scanning direction on a basis of the obtained range information;
  a second unit configured to determine whether or not the determined range is valid; and
  a third unit configured to determine the part of the obtained correction information on a basis of the determined range if the determined range is determined to be valid, and extend the determined range in the main-scanning direction and determine the part of the obtained correction information on a basis of the extended range if the determined range is determined to be not valid.

19. The image processing apparatus according to claim 18, wherein the second unit determines the determined range is not valid if an approximation error at end portion in the main-scanning direction of an area where the image forming unit forms the image is larger than a threshold.

20. The image processing apparatus according to claim 19, wherein the second unit obtains the approximation error by simulating a smoothing image based on a part of the obtained correction information defined by the determined range.

21. The image processing apparatus according to claim 16, wherein the second range is a maximum range in the main-scanning direction in which the image is formed by the image forming unit.

22. The image processing apparatus according to claim 16, wherein the determination unit stores the determined part of the obtained correction information into a register, and the correction unit performs the correction by the shift, by referring to the part stored in the register.

23. The image processing apparatus according to claim 16, further comprising the image forming unit, wherein the image forming unit forms an image based on the image data on which the correction has been performed.

24. A method performed in image processing apparatus, the method comprising:

obtaining correction information of a first range in a main-scanning direction to correct displacement in a sub-scanning direction of an image formed by an image forming unit;

obtaining range information corresponding to a second range in the main-scanning direction in which the image is formed by the image forming unit, the second range being narrower than the first range;

determining a part of the obtained correction information, on a basis of the obtained range information; and performing correction on image data by shifting the image data in the sub-scanning direction on a basis of the determined part of the obtained correction information.

25. The method according to claim 24,
wherein a third range in the main-scanning direction corresponding to the determined part of the obtained correction information is narrower than the first range and wider than the second range, and performing correction of pixel values of the image data on the basis of the determined part of the obtained correction information to smooth a step generated by the performed correction.

26. The method according to claim 25, wherein the determining includes:
determining a range in the main scanning direction on a basis of the obtained range information;
determining whether or not the determined range is valid; and
determining the part of the obtained correction information on a basis of the determined range if the determined range is determined to be valid, and extend the determined range in the main-scanning direction and determine the part of the obtained correction information on a basis of the extended range if the determined range is determined to be not valid.

27. The method according to claim 26, wherein the determining whether or not the determined range is valid, includes determining whether the determined range is not valid if an approximation error at end portion in the main-scanning direction of an area where the image forming unit forms the image is larger than a threshold.

28. The method according to claim 27, wherein the approximation error is obtained by simulating a smoothing image based on a part of the obtained correction information defined by the determined range.

29. The method according to claim 27, wherein the second range is a maximum range in the main-scanning direction in which the image is formed by the image forming unit.

30. The method according to claim 24, wherein the determining includes storing the determined part of the obtained correction information into a register, and the performing correction includes performing the correction by the shift, by referring to the part stored in the register.

31. The method according to claim 24, wherein the image forming unit forms an image based on the image data on which the correction has been performed.

32. A non-transitory computer-readable storage medium storing a program for causing at least one processor to execute an image processing method for forming an image by an image forming unit, the image processing method comprising:

obtaining correction information of a first range in a main-scanning direction to correct displacement in a sub-scanning direction of an image formed by an image forming unit;

obtaining range information corresponding to a second range in the main-scanning direction in which the image is formed by the image forming unit, the second range being narrower than the first range;

determining a part of the obtained correction information, on a basis of the obtained range information; and performing correction on image data by shifting the image data in the sub-scanning direction on a basis of the determined part of the obtained correction information.

33. The medium according to claim 32,
wherein a third range in the main-scanning direction corresponding to the determined part of the obtained correction information is narrower than the first range and wider than the second range, and performing correction of pixel values of the image data on the basis of the determined part of the obtained correction information to smooth a step generated by the performed correction.

34. The medium according to claim 33, wherein the determining includes:
determining a range in the main scanning direction on a basis of the obtained range information;
determining whether or not the determined range is valid; and
determining the part of the obtained correction information on a basis of the determined range if the determined range is determined to be valid, and extend the determined range in the main-scanning direction and determine the part of the obtained correction information on a basis of the extended range if the determined range is determined to be not valid.

35. The medium according to claim 34, wherein the determining whether or not the determined range is valid, includes determining whether the determined range is not valid if an approximation error at end portion in the main-scanning direction of an area where the image forming unit forms the image is larger than a threshold.

36. The medium according to claim 35, wherein the approximation error is obtained by simulating a smoothing image based on a part of the obtained correction information defined by the determined range.

37. The medium according to claim 36, wherein the second range is a maximum range in the main-scanning direction in which the image is formed by the image forming unit.

38. The medium according to claim 32, wherein the determining includes storing the determined part of the obtained correction information into a register, and the performing correction includes performing the correction by the shift, by referring to the part stored in the register.

39. The medium according to claim 24, wherein the image forming unit forms an image based on the image data on which the correction has been performed.

* * * * *